United States Patent
Shin

(10) Patent No.: US 7,389,761 B2
(45) Date of Patent: Jun. 24, 2008

(54) FUEL PUMP NOISE-REDUCTION APPARATUS IN LIQUEFIED PETROLEUM INJECTION VEHICLE

(75) Inventor: Chang Hyun Shin, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 481 days.

(21) Appl. No.: 11/022,231

(22) Filed: Dec. 23, 2004

(65) Prior Publication Data

US 2005/0193991 A1 Sep. 8, 2005

(30) Foreign Application Priority Data

Mar. 4, 2004 (KR) ...................... 10-2004-0014616

(51) Int. Cl.
*F02B 77/08* (2006.01)
(52) U.S. Cl. .................. 123/198 DB; 123/527
(58) Field of Classification Search ........... 123/198 DB, 123/198 D, 525, 527, 179.17, 497, 514
See application file for complete search history.

(56) References Cited

U.S. PATENT DOCUMENTS

| | | | | |
|---|---|---|---|---|
| 4,159,701 A | * | 7/1979 | Murata | 123/324 |
| 4,721,078 A | * | 1/1988 | Watanabe et al. | 123/198 DB |
| 4,809,122 A | * | 2/1989 | Fitzner | 361/18 |
| 4,989,573 A | * | 2/1991 | Yokoyama et al. | 123/527 |
| 5,357,935 A | * | 10/1994 | Oxley et al. | 123/527 |
| 5,557,255 A | * | 9/1996 | Adams et al. | 340/426.3 |
| 5,927,240 A | * | 7/1999 | Maxon | 123/179.3 |
| 6,076,507 A | * | 6/2000 | Blizard et al. | 123/467 |
| 6,148,800 A | * | 11/2000 | Cari et al. | 123/490 |
| 6,766,269 B2 | * | 7/2004 | Lee | 702/136 |
| 7,086,493 B2 | * | 8/2006 | Knight | 180/274 |
| 2005/0081832 A1 | * | 4/2005 | Kim | 123/514 |

* cited by examiner

*Primary Examiner*—Carl S. Miller
(74) *Attorney, Agent, or Firm*—Morgan Lewis & Bockius LLP

(57) ABSTRACT

A fuel pump noise-reduction apparatus in a Liquefied Petroleum Injection (LPI) vehicle comprises a Liquefied Petroleum Gas (LPG) switch. A plurality of shut off valves are configured for activation upon stoppage of battery power via the LPG switch. A fuel pump in a fuel tank is configured for activation upon stoppage of battery power via the LPG switch. The shut off valves close and the fuel pump stops simultaneously when the LPG switch is deactivated, contributing to a reduction in noise and engine output consumption due to unnecessary operation of the fuel pump when the engine stops.

6 Claims, 1 Drawing Sheet

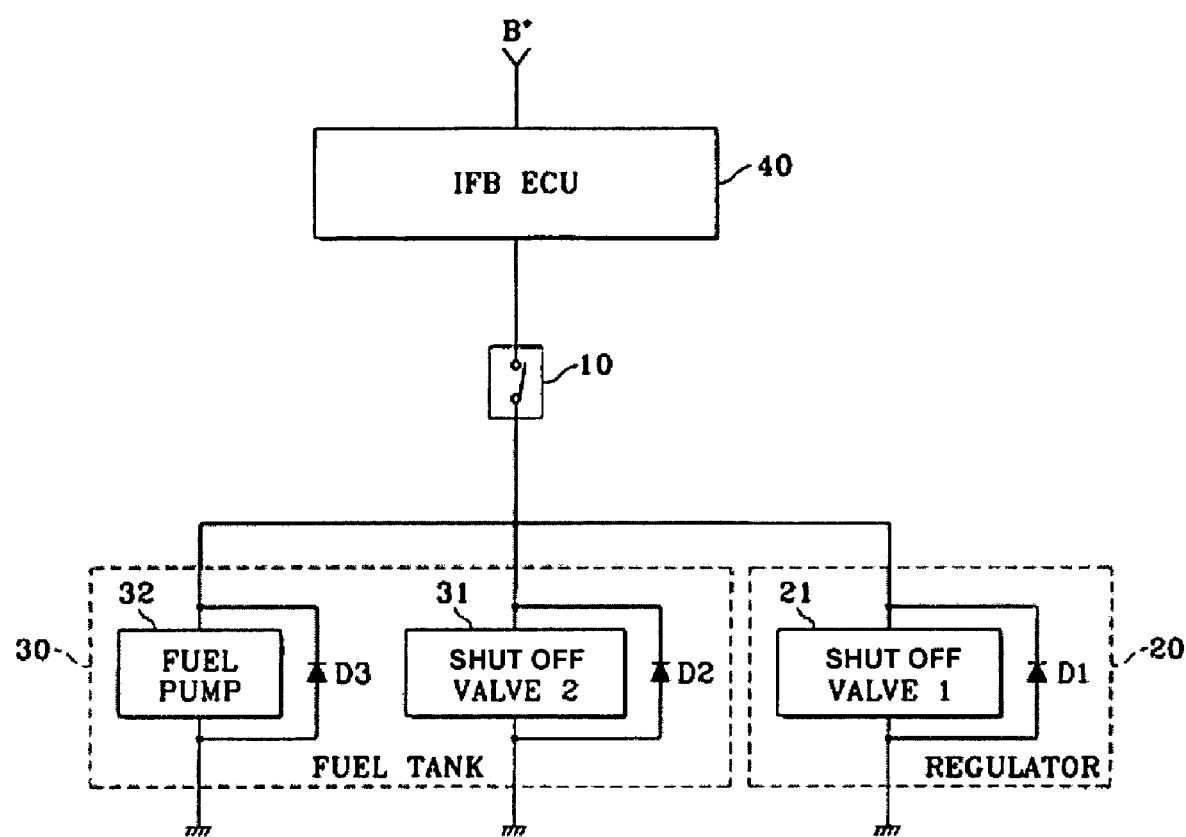

FUEL PUMP NOISE-REDUCTION APPARATUS IN LIQUEFIED PETROLEUM INJECTION VEHICLE

CROSS-REFERENCE TO RELATED APPLICATIONS

The present application claims priority from Korean Application Serial Number 10-2004-0014616, filed on Mar. 4, 2004.

FIELD OF THE INVENTION

The present invention relates to a fuel pump noise-reduction apparatus in a Liquefied Petroleum Injection (LPI) vehicle. More particularly, the present invention relates to an apparatus that controls operation of a fuel shut off valve and fuel pump according to the activation of a Liquefied Petroleum Gas (LPG) switch.

BACKGROUND OF THE INVENTION

Generally, vehicles that use LPG for fuel are configured to inject gaseous LPG into the engine, in which LPG is provided by the fuel tank and is turned into gas by passing through the vaporizer and mixer. However, the LPG engine has drawbacks in terms of the engine output function, fuel economy, vehicle start at a low temperature, exhaust gas and the like. Therefore, LPI engine vehicles have been developed and used recently.

LPI engine vehicles are configured to compressively transfer LPG fuel to an injector through the fuel line by using a fuel pump installed in the fuel tank. Next, the injector injects fuel into the engine in a liquid state to improve engine output, fuel economy, vehicle start function at low temperatures, and exhaust gas emission levels.

In LPI engine vehicles, the fuel tank and regulator are each equipped with a shut-off valve, also called an isolating valve. If the LPG switch is turned off while the engine is running, the Interface Box (IFB) closes the isolating valves and stops the fuel flow from the injector.

Thus, in conventional LPI engine vehicles, when the LPG switch is turned off, the shut-off valves in the fuel tank and regulator are closed to stop the fuel supply. However, there is a drawback in that when the engine stops, the fuel pump continues to operate for a prescribed period of time by employing another power source, thereby causing an increase in noise and output consumption due to the unnecessary operation of the fuel pump.

SUMMARY OF THE INVENTION

An embodiment of the present invention provides a fuel pump noise-reduction apparatus in an LPI vehicle adapted to close shut-off valves of a regulator and fuel tank and to stop the fuel pump when the LPG switch is turned off, thereby decreasing noise and output consumption due to the unnecessary operation of the fuel pump.

In another embodiment, the present invention provides a fuel pump noise-reduction apparatus in a Liquefied Petroleum Injection (LPI) vehicle comprising a Liquefied Petroleum Gas (LPG) switch. A plurality of shut off valves are configured for activation upon receiving battery power via the LPG switch. A fuel pump in a fuel tank is configured for activation upon receiving battery power via the LPG switch. The fuel pump and shut off valves are each connected in parallel to a voltage surge preventing diode. The regulator and the fuel tank are equipped with shut-off valves.

BRIEF DESCRIPTION OF THE DRAWINGS

FIG. 1 is a circuit diagram for a fuel pump noise-reduction apparatus in an LPI vehicle, according to an embodiment of the present invention.

DETAILED DESCRIPTION OF A PREFERRED EMBODIMENT

FIG. 1 is a circuit diagram for a fuel pump noise-reduction apparatus according to an embodiment of the present invention, which comprises an LPG switch 10, an shut off valve 21 in a regulator 20, an shut off valve 31 in a fuel tank 30, a fuel pump 32 in the fuel tank 30, and an Interface Box (IFB) Electronic Control Unit (ECU) 40 for controlling fuel flow. The LPI engine has an Engine Management System (EMS) ECU for controlling the engine and has an IFB ECU for controlling the fuel to activate the vehicle.

The LPG switch 10 is turned on or off, according to the driver's manipulation of the switch 10. In case of an emergency or a potential fuel leakage situation, the driver can turn off the LPG switch 10 to stop the fuel flow to prevent any danger resulting from the fuel leak.

When the LPG switch is turned off, battery power (B+, 12 V power from the rear side of the main relay) terminates at the LPG switch, which causes the shut off valve 21 in the regulator 20 and the shut off valve 31 in the fuel tank 30 to close and stop the fuel flow, as well as causing the fuel pump 32 in the fuel tank 30 to stop operating.

The shut off valve 21 in the regulator 20, the shut off valve 31 in the fuel tank 30, and the fuel pump 32 are preferably connected in parallel to voltage surge preventing diodes (D1, D2, and D3), respectively. Therefore, the shut off valves 21, 31 and fuel pump 32 are prevented from getting damaged or from malfunctioning, due to the voltage surge that is generated when turning the LPG switch 10 on or off.

The operation and effect of the fuel pump noise reducing apparatus in the LPI vehicle according to the embodiment of the present invention will now be described in detail.

If the driver turns off the LPG switch 10 while the engine is running, the battery power provided to the shut off valve 21 in the regulator 20, the shut off valve 31 in the fuel tank 30, and the fuel pump 32 becomes insulated, and the valves 21, 31 close. Therefore, the fuel supply through the injector stops and the fuel pump 32 stops operating.

Further, when turning on or off the LPG switch, the occurrence of a voltage surge is eliminated by the voltage surge preventing diodes (D1, D2, and D3), thus preventing damage or malfunction to the shut off valves 21, 31 and the fuel pump 32 due to the voltage surge.

As apparent from the foregoing, there is an advantage in the present invention in that when the engine stops and the LPG switch is turned off, the shut off valves in the fuel tank and the regulator are closed and the fuel pump is stopped, thereby effectively reducing noise and engine output consumption due to the unnecessary operation of the fuel pump.

While the foregoing description represent various embodiments of the present invention, it will be appreciated that the foregoing description should not be deemed limiting since additions, variations, modifications and substitutions may be made without departing from the spirit and scope of the present invention. It will be clear to one of skill in the art that the present invention may be embodied in other forms, structures, arrangements, and proportions and may use other elements, materials and components. For example, although the apparatus is described in the context of a Liquefied Petroleum Injection vehicle, the apparatus can be adapted for use in fuel pumps used by other types of vehicles. The present disclosed embodiments are, therefore, to be considered in all respects as illustrative and not restrictive, the scope of the invention being indicated by the appended claims and not limited to the foregoing description.

What is claimed is:

1. A fuel pump noise-reduction apparatus in a Liquefied Petroleum Injection (LPI) vehicle, comprising:
    a Liquefied Petroleum Gas (LPG) switch;
    a plurality of shut off valves configured for activation upon receiving battery power via said LPG switch; and
    a fuel pump disposed in a fuel tank configured for activation upon receiving battery power via said LPG switch;
    wherein said fuel pump is electrically connected in parallel to a voltage surge preventing diode;
    wherein each of said shut off valves is electrically connected in parallel to a voltage surge preventing diode;
    and wherein at least a said shut off valve is disposed in a regulator and at least a said shut off valve is disposed in said fuel tank.

2. An apparatus to reduce noise in an automotive fuel pump, comprising:
    a fuel pump disposed within a fuel tank;
    a regulator;
    a first valve connected with said regulator
    a second valve connected with said fuel pump; and
    a LPG switch electrically connected in parallel with said fuel pump, said first valve, and said second valve, and operable to control opening and closing of said first valve and second valve and operation of the fuel pump.

3. The apparatus of claim 2, wherein said first valve is electrically connected in parallel with a first voltage surge preventing diode.

4. The apparatus of claim 2, wherein said second valve is electrically connected in parallel with a second voltage preventing diode.

5. The apparatus of claim 2, wherein said fuel pump is electrically connected in parallel with a third voltage surge preventing diode.

6. The apparatus of claim 2, further comprising a battery that provides battery power to said LPG switch, wherein said battery power terminates at said LPG switch when said switch is turned off.

* * * * *